(12) United States Patent
Lodolo

(10) Patent No.: US 10,801,641 B2
(45) Date of Patent: Oct. 13, 2020

(54) COMPACT HYDRAULIC SERVO-ACTUATED VALVE

(71) Applicant: Alberto Lodolo, Genoa (IT)

(72) Inventor: Alberto Lodolo, Genoa (IT)

( * ) Notice: Subject to any disclaimer, the term of this patent is extended or adjusted under 35 U.S.C. 154(b) by 58 days.

(21) Appl. No.: 16/053,152

(22) Filed: Aug. 2, 2018

(65) Prior Publication Data

US 2019/0049038 A1 Feb. 14, 2019

(30) Foreign Application Priority Data

Aug. 10, 2017 (IT) .................... 102017000093098

(51) Int. Cl.
| | |
|---|---|
| *F16K 7/12* | (2006.01) |
| *F16K 31/385* | (2006.01) |
| *F16K 27/02* | (2006.01) |
| *F16K 31/128* | (2006.01) |

(52) U.S. Cl.
CPC .............. *F16K 31/385* (2013.01); *F16K 7/12* (2013.01); *F16K 7/126* (2013.01); *F16K 27/02* (2013.01); *F16K 27/0236* (2013.01); *F16K 31/128* (2013.01)

(58) Field of Classification Search
CPC .......... F16K 31/385; F16K 7/12; F16K 7/126; F16K 27/0236; F16K 31/128; F16K 7/17
USPC ....................... 251/331, 367, 61.1
See application file for complete search history.

(56) References Cited

U.S. PATENT DOCUMENTS

| | | | | |
|---|---|---|---|---|
| 5,632,465 A * | 5/1997 | Cordua | ................... | F16K 7/126 251/30.02 |
| 5,967,182 A | 10/1999 | Wilson | | |
| 8,881,759 B1 * | 11/2014 | Shtekelmacher | ..... | F16K 31/402 137/489 |
| 2006/0016494 A1 * | 1/2006 | Irwin | ........................ | F16K 7/17 137/625.28 |
| 2006/0118751 A1 * | 6/2006 | Lodolo | ................... | F16K 7/126 251/331 |
| 2008/0035220 A1 * | 2/2008 | Irwin | ..................... | F16K 7/126 137/613 |
| 2010/0071776 A1 * | 3/2010 | Ringer | .................... | F16K 7/126 137/12 |
| 2011/0031427 A1 * | 2/2011 | Sitnikov | ................. | F16K 7/126 251/335.2 |
| 2013/0008542 A1 | 1/2013 | Irwin et al. | | |

(Continued)

FOREIGN PATENT DOCUMENTS

| | | |
|---|---|---|
| WO | 2008034463 A1 | 3/2008 |
| WO | 2015181709 A1 | 12/2015 |

OTHER PUBLICATIONS

Italian Search Report and Written Opinion for Corresponding Italian Application No. IT201700093098 (7 Pages) (May 24, 2018).

*Primary Examiner* — Kelsey E Cary (74) *Attorney, Agent, or Firm* — Lucas & Mercanti, LLP (57) ABSTRACT

A hydraulic servo-actuated valve having a valve body, an actuator and a lid is provided. The valve body has a main opening and a clamping flange arranged around the main opening. The actuator has a central actuation region and a peripheral sealing band. The lid has a central portion and a counter-clamping flange. The valve has a composite actuating duct longitudinally extending between the clamping flange and the counter-clamping flange and the composite actuating duct is obtained by joining a first element and a second element.

10 Claims, 6 Drawing Sheets

(56) References Cited

U.S. PATENT DOCUMENTS

2013/0009086 A1* 1/2013 Walker ................ F16K 31/402
                                                    251/331
2017/0108136 A1* 4/2017 Lodolo ................ F16K 31/385

* cited by examiner

COMPACT HYDRAULIC SERVO-ACTUATED VALVE

CROSS-REFERENCE TO RELATED APPLICATION

This patent application claims the benefit of priority from Italian Patent Application No. 102017000093098, filed Aug. 10, 2017, the contents of which are incorporated herein by reference.

FIELD OF THE INVENTION

The present invention relates to a hydraulic servo-actuated valve, according to the preamble of the main claim.

BACKGROUND OF THE INVENTION

Hydraulic servo-actuated valves are often used in agriculture and are passed through by water that can be dirty and carry small pieces of wood, soil or pebbles.

Such valves are often used in remote or desert areas with scarce human control.

The hydraulic servo-actuated valves comprise a valve body with an inlet duct and an outlet duct, that meet along a sealing edge above which the valve body has a main opening. At such an opening an actuator is arranged, usually an elastically deformable membrane made of rubbery material, whose edge is tightened between the edge of the main opening and the edge of a lid joined to the valve body by a flanged connection. In some embodiments, a piston is connected to the center of the deformable membrane. The lid and the actuator define an actuating chamber adapted to receive the liquid from the inlet duct through a first operative member. When the valve is open, the actuating chamber does not contain liquid under pressure, the actuator is raised by the pressure of the water flowing from the inlet duct to the outlet duct. In order to close the valve, a first operative member connects the inlet duct to the actuating chamber. The liquid entering the actuating chamber from the inlet duct generates a pressure in the actuating chamber that thrusts the actuator to a completely lowered position, leading it to press against the sealing edge, so that to close the passage between the inlet duct and the outlet duct. Water pressure in the actuating chamber can overcome the water pressure in the valve body, since the elastically deformable membrane comprised in the actuator has an idle shape corresponding to the closed position of the valve. In other embodiments, a spring is arranged in the actuating chamber to push the actuator to a valve closed position. The force created by the plastic deformation of the elastically deformable membrane or by the spring is added therefore to the water pressure in the actuating chamber. The liquid in the actuating chamber is drained from a first or second operative member in the outlet duct or outside whenever the valve needs to be opened. By reducing the pressure in the actuating chamber, the thrust on the actuator by the liquid in the inlet duct causes the actuator to lift from the sealing edge, thereby opening the valve.

The operative member may comprise, for example, a pilot or solenoid.

The pilot is adapted to adjust the opening of the valve with continuity, leaving it partially open.

The solenoid normally opens or closes the valve without providing an opportunity to achieve an intermediate partial open position of the valve.

The connections between the operative members and the valve are normally achieved by means of pipes with small diameter.

Such pipes generate three types of problems:

a) if an operative member is connected to both the valve body and lid, the opening of the valve, and therefore the disconnection of the lid from the valve body, to replace or inspect the elastically deformable membrane for example, can only occur once the pipes have been disconnected;

b) the valve assembly times are long because of the need to connect the connection pipes one by one between the valve and operative members;

c) the pipes make the valve unit fragile: soft or rubber pipes can be easily pierced by a rodent, for example, whereas metal pipes can be bent by the weight of a large animal or by the careless behavior of a human operator.

In WO2008034463 the problem of the valve opening without disconnecting the pipes has been solved by positioning the holes on the inlet duct and the outlet duct, at a proper flange obtained on the valve body for the assembly of the lid. The lid has in turn two corresponding through-holes on the flange, for the connection to the inlet duct and the outlet duct, and two through-holes in the central portion that communicate with the actuating chamber. A first and a second operative member can be therefore connected to the actuating chamber and to the inlet and outlet ducts by metal pipes, which are all connected to the lid. This allows the lid to be disassembled and the valve to be opened, e.g. in order to replace the elastically deformable membrane, without the need of disconnecting the operative members from the lid itself.

The Torrent valve of the Company Bermad, described, for example, in US2013233417 (A1), is adapted for connecting the operative members to the valve body only by means of pipes. For this purpose, the lid, as shown in FIG. 5b of US2013233417 (A1), has a duct that brings the fluid from the actuating chamber to the valve body. A curved duct that passes inside of the thickness of the lid, winding around the actuating chamber to reach the valve body, would be very difficult to achieve directly from casting. The problem was solved by making two incident rectilinear holes, each made by drilling, and by closing the outlet towards the outside of one of the two holes with a cap.

A valve wherein an operative member can be directly connected to the lid by means of a flanged coupling is described in WO2015/181709. In the area wherein the hole communicating with the inlet duct (or with the outlet duct) and the hole communicating with the actuating chamber, the lid has a flat surface with threaded blind holes that allow the connection of a flanged operative member, linking the through-holes on the lid to the inlet and outlet holes of the operative member.

This allows a direct connection of the operative member to the lid, thus eliminating interposed metal pipes, which slow down and complicate the assembly, making the unit more fragile.

In such solution, a first operative member can be connected to the inlet duct and the actuating chamber, and a second operative member can be connected to the outlet duct and the actuating chamber.

However, there are also three-way operative members adapted to be connected, in addition to the actuating chamber, both to the inlet duct and the outlet duct.

This is the case, for example, of a three-way pilot adapted to adjust the opening of the valve by using the pressure of the water upstream to supply water at a constant pressure downstream independently from the upstream pressure.

For example, a flanged three-way pilot, which must be connected to the inlet duct, to the actuating chamber and to the outlet duct, can be directly connected to the inlet duct and the actuating chamber if assembled upstream, therefore without pipes (as in WO2015/181709), but a pipe that leads from the three-way pilot to the outlet duct is necessary for the connection to the outlet duct, through the connection hole present at the outlet duct of the lid for example.

Naturally, a flanged three-way pilot can be assembled downstream, therefore directly connected, without pipes, to the outlet duct and to the actuating chamber, whereas the connection with the inlet duct is achieved by means of a pipe.

A problem of the known art is the fragility of the pipe connecting the three-way operative member and the inlet or outlet duct to one another, since it can be easily deformed and crushed.

Another problem are the technical times involved with the assembly of the valve and operative members and which should be reduced as much as possible.

Another problem is the potential obstruction of such pipe due to the dirt circulating in the duct and to its maintenance.

SUMMARY OF THE INVENTION

An object of the present invention is therefore to implement a hydraulic servo-actuated valve that allows to overcome the aforesaid drawbacks, in particular, an object is to implement a servo-actuated valve that allows to simplify and speed up the assembly of the operative members on the valve.

Another object is to achieve a more robust hydraulic servo-actuated valve, also as far as external actions are concerned.

Another object is to achieve a servo-actuated valve that allows to simplify the cleaning operations in case of obstructions in the connection ducts to the operative members, which have a small diameter by nature.

Said objects are obtained by a hydraulic servo-actuated valve whose inventive features are highlighted by the claims.

BRIEF DESCRIPTION OF THE DRAWINGS

The invention will be better understood from the following detailed description, provided by way of example only, and therefore not limiting, of two preferred embodiments illustrated in the attached drawings in which.

DETAILED DESCRIPTION OF THE INVENTION

With reference to the figures, it is clear that the hydraulic servo-actuated valve according to the invention comprises a valve body 1, an actuator 2 and a lid 3.

The valve body 1 comprises a first duct 4, or inlet duct, with a first opening 5 adapted for the inflow of a fluid, such as water for example, a second duct 6, or outlet duct, with a second opening 7 adapted for the outflow of said fluid, a main opening 8 arranged on the valve body 1, between the first duct 4 and the second duct 6, a clamping flange 9 arranged around the main opening 8.

The actuator 2 comprises a central actuation region 10 and a peripheral sealing band 11.

The lid 3 comprises a central portion 12 and a counter-clamping flange 13, the central portion 12 contributing to delimit, together with the actuator 2, an actuating chamber 14, the counter-clamping flange 13 being adapted to be clamped against the clamping flange 9, with said peripheral sealing band 11 of the actuator 2 interposed.

The bulge 32 of the lid 3 can be useful for a manual control of the valve by injecting a fluid under pressure directly into the actuating chamber and could also not be present.

Figure 1:
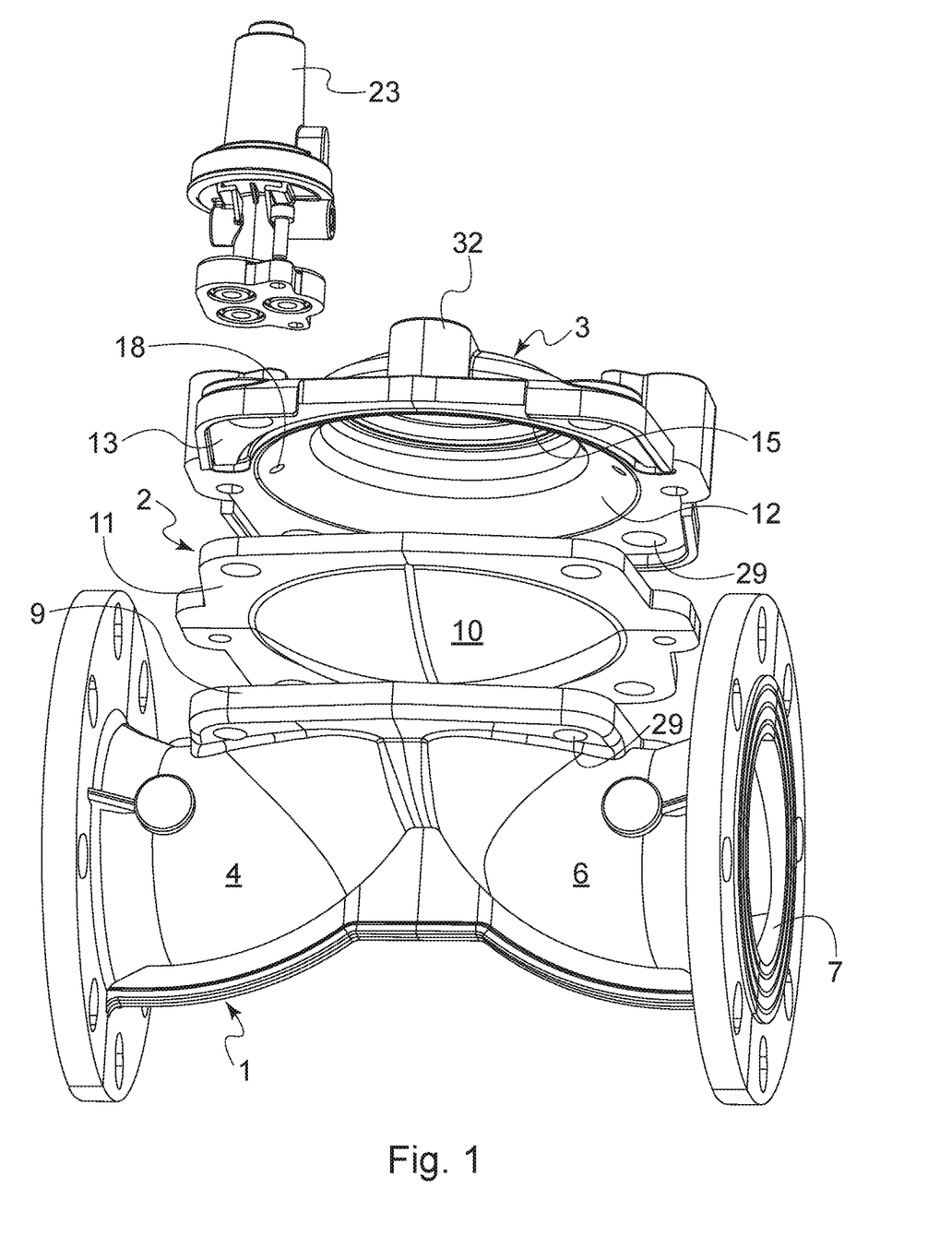
FIG. 1 shows an exploded perspective view of a first embodiment of the hydraulic servo-actuated valve according to the invention, with a channel on the lid adapted to form a composite actuating duct.
Figure 3A:
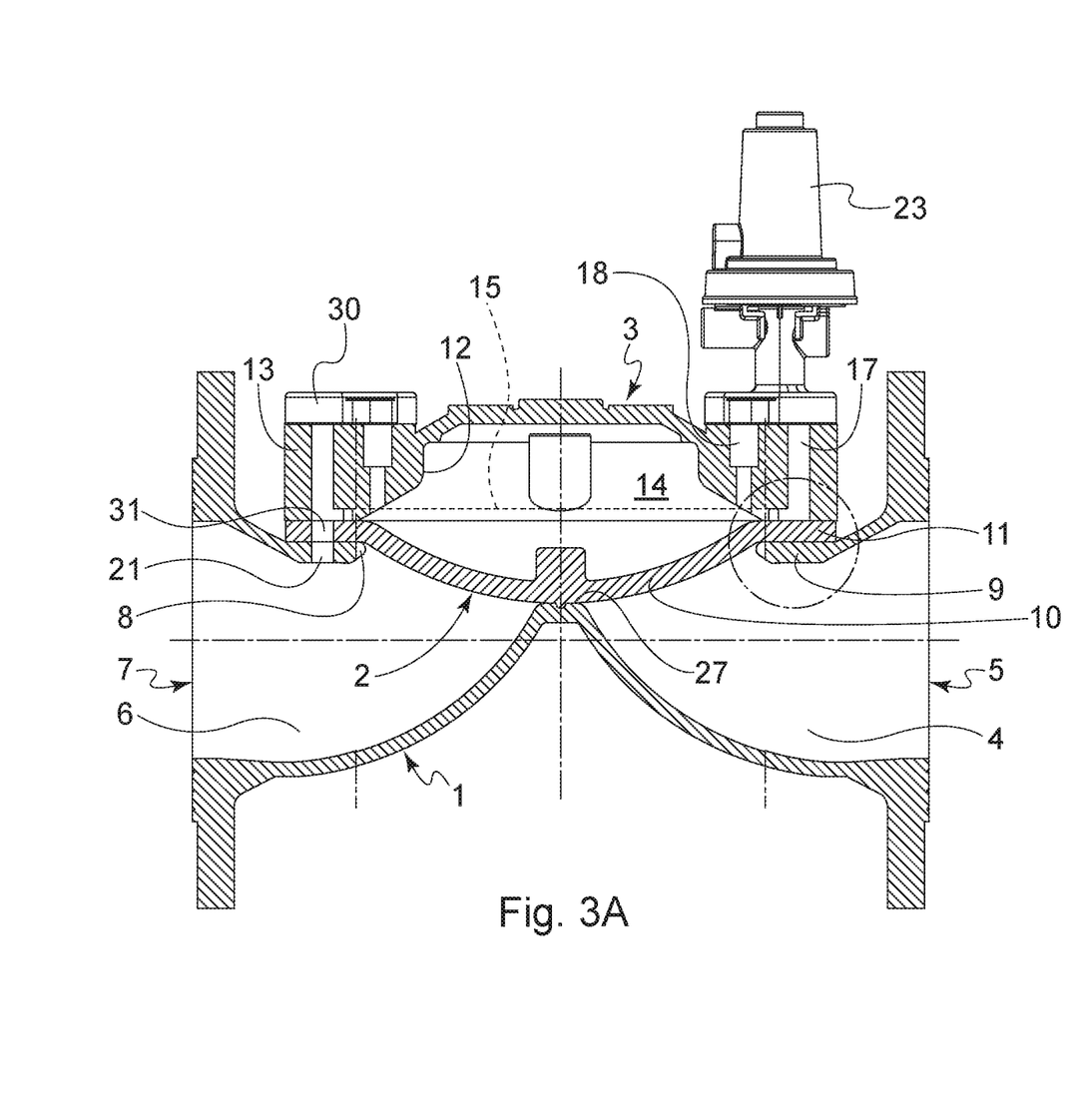
FIG. 3A shows a longitudinal section of the valve according to the broken line A-A of FIG. 2, with the addition of an operative member and a cap connected to the lid.
Figure 3B:
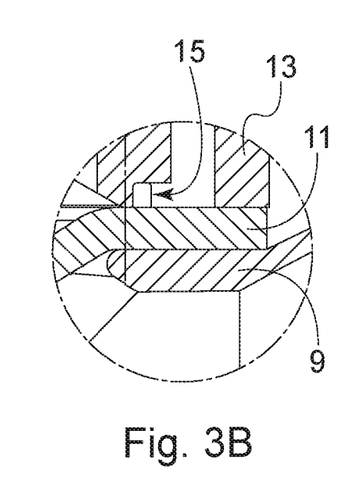
FIG. 3B shows an enlargement of the circled part of FIG. 3A.

The actuator 2 can only comprise an appropriately shaped elastically deformable membrane, like in FIG. 1 and FIG. 3A, with eventually a spring between the elastically deformable membrane and the lid, or can comprise both an elastically deformable membrane and a rigid central piston.

The actuator is adapted to perform an actuating movement between a raised open position, which allows the flow between the first duct 4 and the second duct 6, and a lowered closed position (FIG. 3A), which prevents the flow between the first duct 4 and the second duct 6, making part of the actuator press against a sealing edge 27 that delimits the joint between the first and second duct.

If the actuator comprises a piston, such sealing edge has a shape adapted to receive the piston, circular for example.

In the embodiment shown in the figures, the clamping flange 9 and the counter-clamping flange 13 have clamping through-holes 29 transversally crossing both the clamping flange 9 and the counter-clamping flange 13. Such holes are used to fasten the lid 3 on the valve body 1 by means of bolts. Said holes could be absent and the lid 3 and valve body 1 could be fastened against one another by different means, such as jaws for example, even in the absence of protruding flanges adapted to be mutually coupled. It is therefore useful to specify that the terms clamping flange and counter-clamping flange also intend to comprise the edge of the main opening 8 of the valve body 1 only and the edge of the lid 3 adapted to be fastened against one another.

A sealing gasket is normally interposed between the lid 3 and the valve body 1, in this case the peripheral sealing band 11 of the actuator 2.

Figure 2:
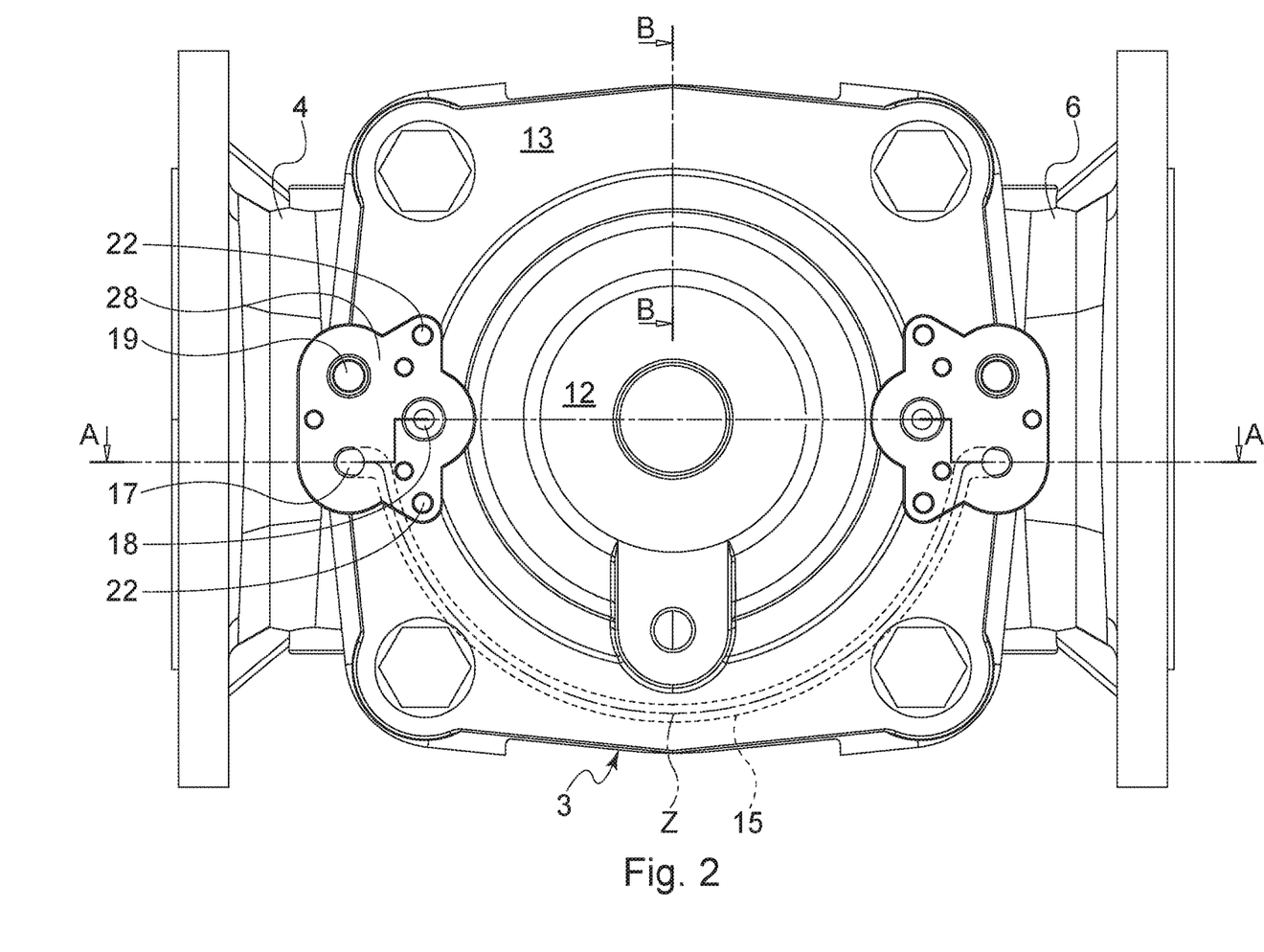
FIG. 2 shows a plan view of the valve, on the side of the lid.

In the exemplary embodiment, the lid 3 comprises a flat connecting surface 28, which extends over the counter-clamping flange 13 at the first duct 4 and over the central portion 12 of the lid 3 (FIG. 2).

The counter-clamping flange 13 of the lid 3, on the connecting surface 28, comprises a first through-hole 17.

The central portion 12 of the lid 3, at the connecting surface 28, comprises a second through-hole 18.

The counter-clamping flange 13 of the lid 3, at the connecting surface 28, also comprises a third through-hole 19.

The clamping flange 9 of the valve body 1, in the region where it overlaps the first duct 4, comprises a fourth through-hole (not visible in the figures) arranged in continuity to the hole 19, which crosses the clamping flange 9 to reach the first duct 4.

Said third through-hole 19 and fourth through-hole are arranged in series when the lid 3 is assembled on the valve body 1 in an operative position, so that the third through-hole 19 and the fourth through-hole connect the first duct 4 to the outside or a first operative member when assembled.

Said second through-hole 18 connects the actuating chamber 14 with the outside environment of the valve or with a first operative member when assembled.

The clamping flange 9 of the valve body 1, in the region where it overlaps the second duct 6, comprises a fifth through-hole 21, which crosses the clamping flange 9 to reach the second duct 6.

According to the invention, the valve comprises a composite actuating duct 15 extending longitudinally, i.e. along its length, between the clamping flange 9 and the counter-clamping flange 13, thereby connecting the first through-hole 17 to the fifth through-hole 21 and, therefore, the second duct 6 to the operative member assembled on the first duct 4.

The term "composite actuating duct" is attributed to the fact that said actuating duct consists of two or more parts, in fact, said composite actuating duct 15 is achieved by joining a first element, such as the appropriately shaped counter-clamping flange 13 of the lid 3 for example, to at least one second element, such as the peripheral sealing band 11 of the actuator 2, which is fastened between the clamping flange 9 and the counter-clamping flange 13.

Figure 4A:
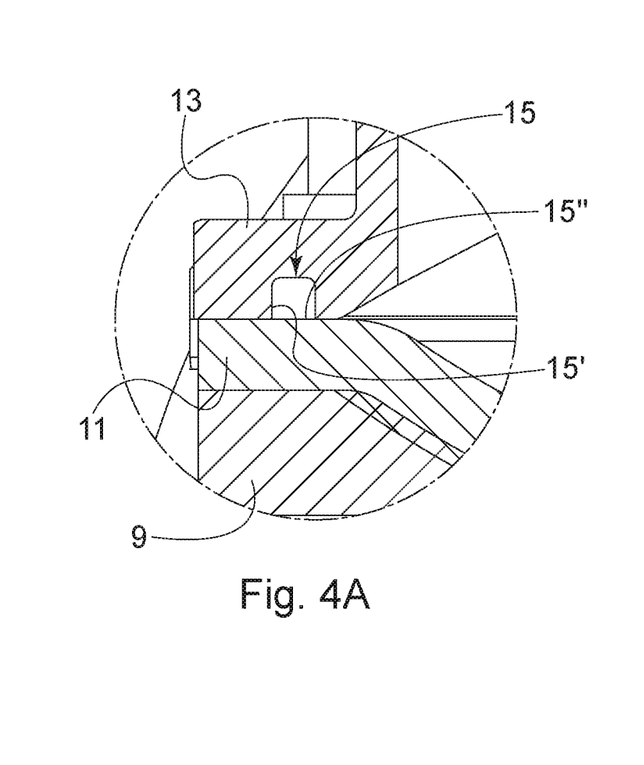
FIG. 4A shows the B-B section of FIG. 2, wherein a cross section of the composite actuating duct and its Z axis are shown.
Figure 4B:
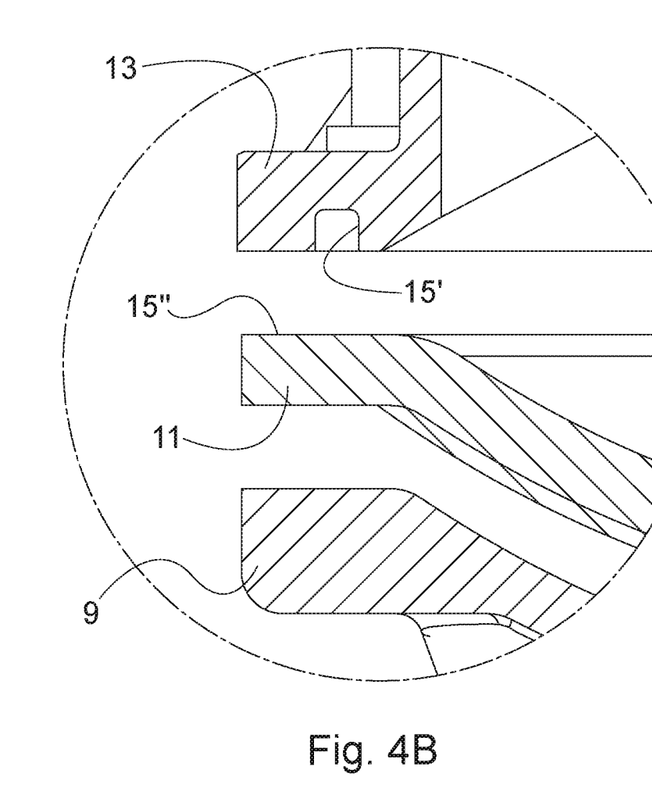
FIG. 4B shows an exploded view of the B-B-section of FIG. 2, wherein the elements adapted to form the composite actuating duct are separated.

Said first element, the counter-clamping flange 13 for example, comprises a first longitudinal portion 15' of the composite actuating duct 15, a channel for example, like in FIGS. 1, 5, 4A and 4B, and said second element, such as the peripheral sealing band 11 for example, comprises a second longitudinal portion 15" of the composite actuating duct 15, such as a flat surface for example (FIGS. 4A and 4B).

The side surface of the composite actuating duct 15 consists of said longitudinal portions 15' and 15", each of which extends longitudinally without fully surrounding the Z axis, which passes in the center of the composite actuating duct 15 (FIG. 2).

As shown in FIGS. 4A and 4B, the composite actuating duct 15 is achieved by joining or coupling at least two elements, each comprising a longitudinal portion of said composite actuating duct.

In other words, the composite actuating duct 15 is achieved by the longitudinal joining of said at least two longitudinal portions 15' and 15", which close around the Z axis, fully surrounding it.

The composite actuating duct 15, being formed by two longitudinal portions comprised in different elements, has the properties of a plan that, transversally intersecting said composite actuating duct 15, intersects both said first element and said second element.

In the depicted exemplary embodiment, either said first element 13 or said second element 11 comprises a channel, i.e. an open longitudinal duct adapted to form said composite actuating duct when said first and second elements are joined to one another.

The lid 3 comprises connecting means, such as threaded and blind holes 22, for example, adapted to only connect to the lid 3 of a flanged operative member 23 by means of a flanged coupling to the connecting surface 28, so as to operatively connect said flanged operative member 23 to said first, second and third through-holes 17, 18 and 19 and through said holes to the first duct 4, to the second duct 6 and to the actuating chamber 14.

The peripheral sealing band 11, appropriately drilled and extending between the third through-hole 19 and the fourth through-hole, creates the seal when the fluid passes from the first duct 4 to the flanged operative member 23.

The same peripheral sealing band 11, extending around the actuating chamber 14, makes it possible to achieve a second longitudinal portion of the composite actuating duct 15 and a good sealing of the same.

A cap 30, useful to plug the unused through-holes anyhow made on the lid for its greater versatility, is also shown in FIG. 3A.

Still for greater versatility, the first, second and third through-holes 17, 18 and 19 can be threaded in the absence of a flanged operative member and whenever the connection to an operative member must be achieved by means of pipes.

The composite actuating duct 15 extends longitudinally, i.e. along its length, around the actuating chamber, thus allowing the connection of the operative member to either the first or second duct 4 and 6, also when said operative member is not directly arranged at said first or second duct 4 and 6.

In the example in FIG. 3A, the operative member is arranged on the lid 3 at the first duct 4, and is connected to the second duct 6 through said composite actuating duct 15, comprised between the clamping flange 9 and the counter-clamping flange 13, said composite actuating duct 15 following a longitudinal path winding around the actuating chamber 14 to connect to the second duct 6 through the fifth through-hole 21.

Naturally, the peripheral sealing band 11 is appropriately drilled (hole 31 in FIG. 3A) at the fifth through-hole 21.

Figure 5:
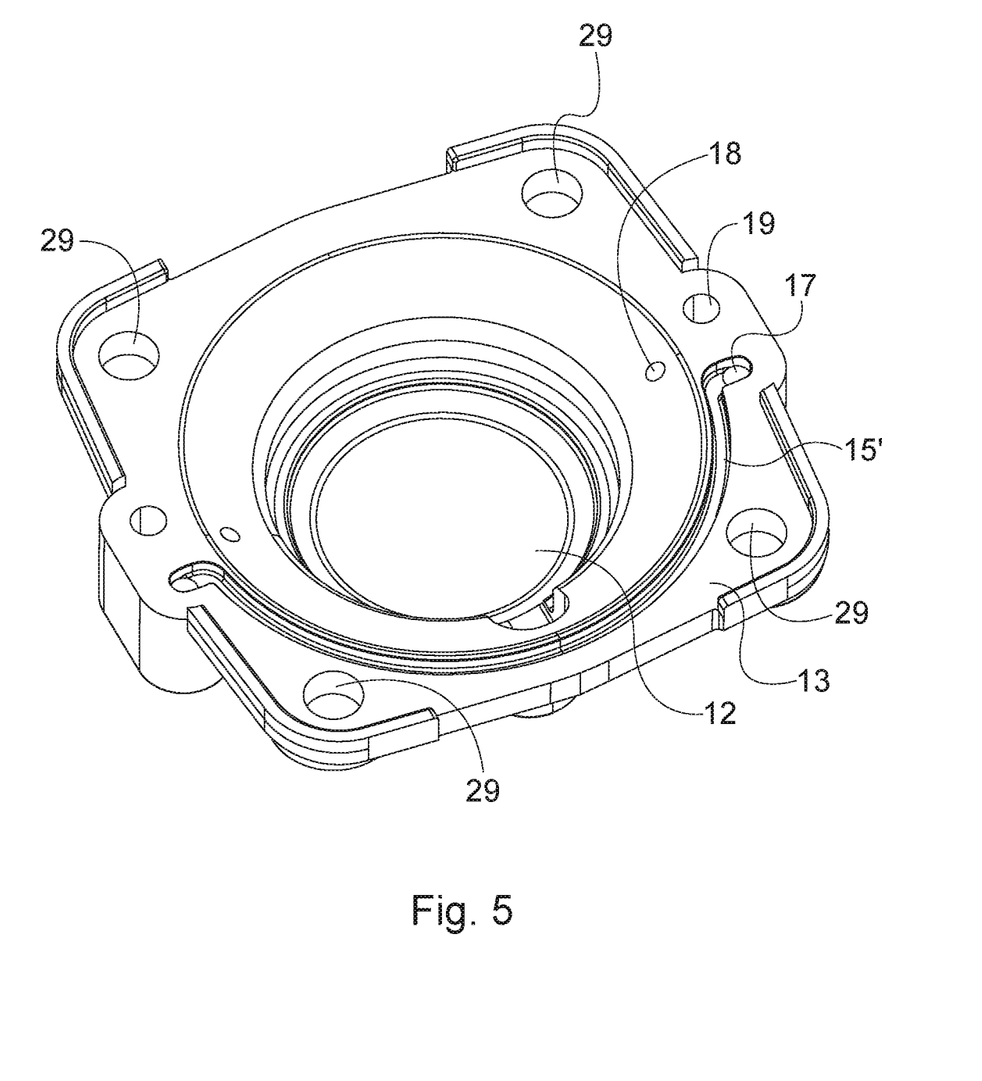
FIG. 5 shows a perspective view of the lid of the first embodiment.

As shown in FIG. 5, the first longitudinal portion 15' can comprise a channel adapted to form a composite actuating duct when the first element is joined to the second element.

Generally, such channel can be comprised in either said first element or said second element or both.

Said peripheral sealing band could also comprise a groove and the surface of the flange adapted to be fastened to the peripheral sealing band could be straight.

Or, said peripheral sealing band could also comprise a slot. In this case, the facing surfaces of the clamping flange and the counter-clamping flange may not have a channel.

If the peripheral sealing band forms a slot, the two flanges (of the lid and valve body) fastened to said slot would form the composite actuating duct together with the inner surface of the same slot, and the composite actuating duct would be achieved by the joining of three elements.

Naturally, one or more elements adapted to form the composite actuating duct could comprise one or more grooved bodies interposed between the clamping flange and the counter-clamping flange, even if this is not the preferred embodiment, since more complex.

Generally, the composite actuating duct 15 is connected to either the first duct 4, the second duct 6 or the actuating chamber 14.

For a greater versatility of the lid or valve body, the composite actuating duct 15 could be connected to more than just either the first duct 4, the second duct 6, the actuating chamber 14 or the outside, then inserting a cap to close the unwanted connections from a functional point of view, such as the cap 30 of FIG. 3A for example.

For the purpose of connecting two operative members to the valve, there can also be two composite actuating ducts, for example, by implementing two symmetric channels on the counter-clamping flange that rotate around the central portion 12 of the lid 3.

Figure 6:
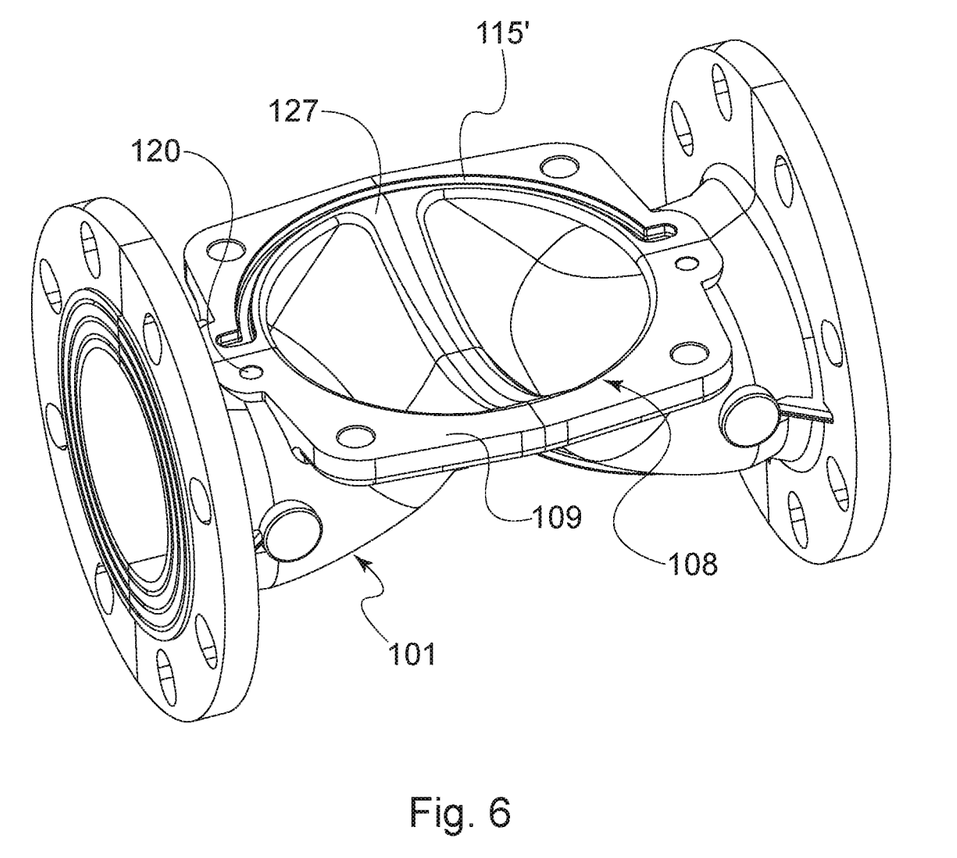
FIG. 6 shows a perspective view of the valve body of a second embodiment.

Only the valve body 101 of a second embodiment without the actuator and lid is shown in FIG. 6.

In such figure, the numbers of reference to the different elements are increased by 100 compared to the elements of the first embodiment.

FIG. 6 shows that a first longitudinal portion 115' of said composite actuating duct comprises a channel obtained on the surface of the clamping flange 109 facing the counter-clamping flange, the peripheral sealing band of the membrane being intended to form the second longitudinal portion.

FIG. 6 also shows the fourth through-hole 120 corresponding to the fourth through-hole of the first embodiment not shown in the preceding figures.

In another embodiment, not shown for simplicity, said valve could comprise at least one composite actuating duct connected to at least either the first duct, the second duct or the actuating chamber, the valve body comprising connecting means adapted to connect a flanged operative member to the valve body only.

Once the flanged operative member is connected to the valve body only, said flanged operative member is operatively connected to the first duct, the second duct and the actuating chamber. Naturally, at least one of said connections to the first duct, the second duct and the actuating chamber of the flanged operative member is obtained by means of at least one composite actuating duct.

In such embodiment, one or more operative members are connected to the valve body only instead of to the lid, therefore making it possible to open the valve without disconnecting the operative members.

The flanged connection of the operative member to the valve body only makes it possible to obtain a more solid and compact structure compared to the connection by means of pipes.

Thanks to the presence of one or more composite actuating ducts, an operative member can be connected at any point on the clamping flange, and therefore on the valve body, or on the counter-clamping flange, and therefore on the lid, not necessarily near the first or second duct.

For example, an operative member could be arranged on the lid at any point of the counter-clamping flange and be connected to the first duct 4 by a first composite actuating duct formed by a channel in the counter-clamping flange of the lid and by the peripheral sealing band;

to the second duct 6 by a second composite actuating duct formed by a channel in the clamping flange of the valve body and by the peripheral sealing band;

and to the actuating chamber 14 by a third composite actuating duct formed by a channel in the counter-clamping flange and by the peripheral sealing band or directly by a through-hole made on the central portion of the lid.

If the operative member is arranged on the clamping flange of the valve body 1, a composite actuating duct, for the connection to the actuating chamber obtained by a groove on the counter-clamping flange of the lid, could be a simple and effective solution to connect such operative member to the actuating chamber, in place of the solution adopted by Bermad in the aforesaid Torrent valve.

In this case, the valve body should comprise connecting means, such as a flat connecting surface and threaded blind holes adapted for the connection of one flanged operative member to the valve body only for example, so as to operatively connect said flanged operative member to the first duct, the second duct and the actuating chamber by means of three composite actuating ducts.

The seal between the connecting through-holes, for example to the first or second duct arranged in series on the lid and valve body, can be obtained by an o-ring, or by the peripheral sealing band with appropriately arranged holes.

It is advantageous that at least either the lid, the valve body or actuator is reversible so that the lid is adapted to be assembled on the valve body both in a first operative position and in a second operative position rotated by 180° compared to the first, by reversing the upstream side and the downstream side.

In this case, the channel must be arranged on the clamping flange or on the counter-clamping flange or on both to help form the composite actuating duct, as the other holes and connecting means will ensure a correct functional connection for both of the operative positions of the lid.

This can be obtained thanks to the insertion of appropriate caps that make it possible to achieve the connections desired and to avoid undesired ones.

A great advantage of obtaining one or more composite actuating ducts by means of joining two elements, such as the grooved clamping flange and/or grooved counter-clamping flange and the peripheral sealing band is that the channel, or first longitudinal portion 15' (FIG. 1 and FIG. 5) can be easily obtained by casting the piece without making undercuts and without requiring subsequent mechanical works.

For example, the solution shown by Bermad requires two lid holes intersecting one another, to create a duct extending longitudinally in the hard metal of the elbow-like curved lid.

Such work is laborious and costly.

According to this invention, however, a curved composite actuating duct can be obtained through the longitudinal joining of two elements: a first and a second longitudinal portion 15' and 15".

Moreover, according to the invention, the composite actuating duct can have a soft curve adapted to be less easily obstructed compared to the elbow-like curve obtained by the two intersecting rectilinear holes.

The composite actuating duct can be cleaned very easily and completely by opening the valve, therefore by disconnecting the lid from the valve body.

Advantageously, in the preferred embodiment, one of the longitudinal portions of the composite actuating duct 15 comprises the peripheral sealing band of the actuator, or anyhow a sealing element made of a rubbery material.

In this way, said composite actuating duct has a good seal and no losses from the side surface of the joint of the two longitudinal portions.

Naturally, the composite actuating duct can also be obtained by joining two metal or plastic elements if the seal is sufficiently good and if, for example, the valve is made of plastic material.

The implementation of the composite actuating ducts between the clamping flange and the counter-clamping flange provides greater versatility in terms of the positioning of the operative members, which can be arranged along the entire perimeter of the clamping flange, on the valve body, and of the counter-clamping flange, on the lid.

Moreover, the assembly of the flanged operative members on the valve makes it possible to completely eliminate the connection pipes of such operative members, therefore achieving a reduction in the assembly times and a greater robustness of the valve as a whole.

According to the invention described, a hydraulic servo-actuated valve without actuating pipes can therefore be obtained, also by assembling two three-way operative members.

Such a valve, with one or more composite actuating ducts and operative members provided with flanged connection, provides a valve without actuating pipes, and therefore a particularly robust and compact valve.

The invention claimed is:

1. A hydraulic servo-actuated valve comprising a valve body, an actuator and a lid,
   the valve body comprising a first duct with a first opening, a second duct with a second opening, a main opening arranged on the valve body between the first duct and the second duct, a clamping flange arranged around the main opening;
   the actuator comprising a central actuation region and a peripheral sealing band;
   the lid comprising a central portion and a counter-clamping flange, the central portion concurring with the actuator in delimiting an actuating chamber, the counter-clamping flange being adapted to be clamped against the clamping flange with the interposition of said peripheral sealing band of the actuator;
   said actuator being adapted to make an actuation movement between an open position, which allows the flow between the first duct and the second duct, and a closed position preventing the flow between the first duct and the second duct,
   said valve being adapted to a connection of a three-way operative member, only to the lid, in such a way that said three-way operative member is connected to the first duct, to the second duct and to the actuating chamber, and said valve further comprising a composite actuating duct longitudinally extending between the clamping flange and the counter-clamping flange, wherein said composite actuating duct is obtained by joining solely a first element and a second element, and is connected to at least one of the first duct, the second duct and the actuating chamber,
   said first element comprising the counter-clamping flange of the lid or the clamping flange of the valve body, and
   said second element comprising the peripheral sealing band of the actuator.

2. The hydraulic servo-actuated valve according to claim 1, wherein said first element comprises a first longitudinal portion of the composite actuating duct and in that said second element comprises a second longitudinal portion of the composite actuating duct.

3. The hydraulic servo-actuated valve according to claim 1, wherein a transversal cross section of said composite actuating duct comprises both said first element and said second element.

4. The hydraulic servo-actuated valve according to claim 1, wherein at least one of said first element and said second element comprises a channel adapted to form said composite actuating duct when said first and second elements are joined to each other.

5. The hydraulic servo-actuated valve according to claim 1, wherein the counter-clamping flange of the lid comprises a first through-hole, the central portion of the lid comprises a second through-hole, the counter-clamping flange of the lid comprises a third through-hole, the clamping flange of the valve body, in the region where the clamping flange overlaps with the first duct, comprises a fourth through-hole that passes through both the clamping flange and the first duct, the clamping flange of the valve body, in the region where the clamping flange overlaps with the second duct, comprises a fifth through-hole that passes through both the clamping flange and the second duct,
   said third through-hole and fourth through-hole connecting the first duct to an outside
   said second through-hole communicating the actuating chamber with the outside of the valve; and
   said composite actuating duct being connected to the second duct via said fifth through-hole and to the outside via said first through-hole,
   wherein said valve is adapted for the connection of the three-way operative member to the lid in such a way that the third through-hole and the fourth through-hole connect the first duct to said three-way operative member when assembled; said second through-hole connects the actuating chamber with said three-way operative member when assembled; and said composite actuating duct connects the first through-hole to the fifth through-hole and, therefore, the second duct to the three-way operative member when assembled.

6. The hydraulic servo-actuated valve according to claim 5, wherein the lid comprises connecting means adapted to the connection of a flange of the three-way operative member only to the lid, so that said three-way operative member is connected to said first, second and third through-holes.

7. The hydraulic servo-actuated valve according to claim 1, wherein said actuator comprises an elastically deformable membrane.

8. The hydraulic servo-actuated valve according to claim 1, wherein at least one of the lid, the valve body and the actuator is reversible.

9. The hydraulic servo-actuated valve according to claim 1, further comprising two or three composite actuating ducts respectively connected to the first duct, the second duct and the actuating chamber.

10. The hydraulic servo-actuated valve according to claim 1, wherein the lid comprises two symmetrical channels adapted to form two composite actuating ducts.

* * * * *